US010605429B2

(12) United States Patent
Mayer et al.

(10) Patent No.: US 10,605,429 B2
(45) Date of Patent: Mar. 31, 2020

(54) HEAT SINK HAVING VARIABLE THERMAL RESISTANCE

(71) Applicant: ZKW GROUP GMBH, Wieselburg (AT)

(72) Inventors: Peter Mayer, Neumarkt an der Ybbs (AT); Michael Brunner, Poggstall (AT); Martin Ebner, Amstetten (AT)

(73) Assignee: ZKW GROUP GMBH, Wieselburg (AT)

(*) Notice: Subject to any disclaimer, the term of this patent is extended or adjusted under 35 U.S.C. 154(b) by 0 days.

(21) Appl. No.: 16/461,319

(22) PCT Filed: Oct. 25, 2017

(86) PCT No.: PCT/AT2017/060287
§ 371 (c)(1),
(2) Date: May 15, 2019

(87) PCT Pub. No.: WO2018/090067
PCT Pub. Date: May 24, 2018

(65) Prior Publication Data

US 2020/0072435 A1 Mar. 5, 2020

(30) Foreign Application Priority Data

Nov. 17, 2016 (AT) .............................. A 51043/2016

(51) Int. Cl.
*B60Q 1/00* (2006.01)
*B60Q 1/04* (2006.01)
(Continued)

(52) U.S. Cl.
CPC ............... *F21S 45/48* (2018.01); *F21S 41/28* (2018.01); *F21S 41/148* (2018.01); *F28F 2013/008* (2013.01)

(58) Field of Classification Search
CPC .......... F21S 45/48; F21S 41/28; F21S 41/148; F28F 2013/008
See application file for complete search history.

(56) References Cited

U.S. PATENT DOCUMENTS 5,131,456 A 7/1992 Wu
2008/0081232 A1 4/2008 Kuwata et al.
(Continued)

FOREIGN PATENT DOCUMENTS

DE 102006001711 7/2007
DE 102007057056 5/2009
(Continued)

OTHER PUBLICATIONS

WO2018090067-ETWOS-20190415-9890_machine translation of isr (Year: 2018).*
(Continued)

*Primary Examiner* — Tracie Y Green
(74) *Attorney, Agent, or Firm* — Eversheds Sutherland (US) LLP

(57) ABSTRACT

The invention relates to a motor vehicle headlight (100), comprising a headlight housing (102) and a cover plate (103) having at least one light source (104, 105) arranged in said motor vehicle headlight (100). In order to cool the at least one light source (104, 105), a heat sink device (200) is provided. Said heat sink device (200) comprises two heat sink elements (106, 107, 201, 202, 501, 502, 601, 602, 701, 702, 801, 802, 901, 902, 1001, 1002) that are separated from one another by an air gap (209) and that are arranged in such a way that a first heat sink element (106, 201, 501, 601, 701, 801, 901, 1001) is mounted inside the motor vehicle headlight (100), and a second heat sink element (107, 202, 502, 602, 702, 802, 902, 1002) is mounted outside the motor vehicle headlight (100). The heat sink device (200) is provided with a contacting device (210) that allows a heat exchange between the heat sink elements (106, 107, 201, 202, 501, 502, 601, 602, 701, 702, 801, 802, 901, 902, 1001, 1002) via said contacting device (210), whenever the temperature inside the motor vehicle headlight (100) is higher than the temperature in the area outside the motor vehicle headlight (100), and no heat exchange between the heat sink elements (106, 107, 201, 202, 501, 502, 601, 602, 701, 702, 801, 802, 901, 902, 1001, 1002) is possible whenever the
(Continued)

temperature inside the motor vehicle headlight (100) is lower than the temperature in the area outside the motor vehicle headlight (100).

19 Claims, 3 Drawing Sheets

(51) Int. Cl.

| | |
|---|---|
| ***F21S 45/10*** | (2018.01) |
| ***F21S 45/48*** | (2018.01) |
| ***F21S 41/20*** | (2018.01) |
| *F28F 13/00* | (2006.01) |
| *F21S 41/148* | (2018.01) |

(56) References Cited

U.S. PATENT DOCUMENTS

| | | | | |
|---|---|---|---|---|
| 2009/0059594 | A1 | 3/2009 | Lin | |
| 2018/0363878 | A1* | 12/2018 | Potluri | F21S 41/148 |
| 2019/0086054 | A1* | 3/2019 | Iwao | F21S 45/43 |
| 2019/0283658 | A1* | 9/2019 | Furui | F21S 45/10 |

FOREIGN PATENT DOCUMENTS

| | | |
|---|---|---|
| EP | 2602538 | 6/2013 |
| JP | 2009021135 | 1/2009 |
| JP | 2012174354 | 9/2012 |

OTHER PUBLICATIONS

Tanida, Japanese patent application JP2009021135, Jan. 2009 machine translation (Year: 2009).*
Buthe, German patent application DE102007057056, May 2009, machine translation (Year: 2009).*
International Search Report, WO App. PCT/AT2017/060287, dated Jun. 2, 2018 (6 pages).
Office Action, AT App. 51043/2016, dated Nov. 17, 2016 (3 pages).

* cited by examiner

HEAT SINK HAVING VARIABLE THERMAL RESISTANCE

The invention relates to a motor vehicle headlight, comprising a headlight housing and a cover plate including at least one light source arranged in this motor vehicle headlight, wherein the light of the at least one light source can be imaged ahead of the motor vehicle headlight in the form of a defined light distribution, and wherein a heat sink device is provided for cooling the at least one light source.

On a motor vehicle headlight, light sources are generally arranged inside the headlight housing, such as filament lamps, high-intensity discharge lamps or light-emitting diodes. During operation of the motor vehicle headlight, these customary light sources and the components thereof generate heat, which must be dissipated. Light-emitting diodes in particular should be kept below the maximum operating temperature thereof to ensure optimal output and a long service life.

In general, the ambient temperature of the vehicle headlight being operated is lower than inside the motor vehicle headlight itself, and the most practical approach thus is to give off the generated heat inside the motor vehicle headlight to the ambient temperature.

However, since the headlight housing of a motor vehicle headlight and a cover plate covering the front region of the housing usually fluidically separate the inside of the motor vehicle headlight from the surrounding area so as to prevent impurities, such as dust or other dirt particles, from penetrating into the interior of the motor vehicle headlight, a dedicated cooling device is provided, which is mounted so as to cool the inside of the motor vehicle headlight and the light sources arranged therein by giving off heat to the outside surrounding area.

Motor vehicle headlights are normally attached to a section of the vehicle frame abutting the engine compartment, which often has considerably higher temperatures than the outside ambient temperature. During operation of the vehicle, for example, heat is given off in the engine compartment by the internal combustion engine and a wide variety of components.

Likewise, the air in the engine compartment is heated by the sun's energy during use as well as non-use of the vehicle. It would therefore be an obvious choice to dissipate the temperature inside the motor vehicle headlight via the cover plate of an installed motor vehicle headlight, as is described in the patent application DE 10 2006 057 569 B4. However, this is refrained from for appearance reasons and so as not to limit the functionality of the cover plate, which can have a partially transparent design in the light-emitting direction of the motor vehicle headlight.

So as not intervene into the outer appearance of the vehicle with further structural measures, heat sink devices are mounted on the vehicle headlights in such a way that these are arranged in the direction of the engine compartment when installed. As was already mentioned, the temperature in the engine compartment can possibly be as high as, or higher than, the temperature inside the motor vehicle headlight. In this case, it is not possible for the heat sink device arranged in the direction of the engine compartment to cool the inside of the motor vehicle headlight, but the device would even heat it further.

It is therefore advantageous to configure the motor vehicle headlight with a cooling device that shields the inside of the motor vehicle headlight and the light sources arranged therein against the relatively high temperatures in the engine compartment.

It is the object of the invention, with respect to the aforementioned restrictions and other shortcomings of the prior art, to provide a motor vehicle headlight comprising a heat sink device, which cools the inside of the motor vehicle headlight and shields the light sources arranged therein against the relatively high temperatures in the engine compartment.

This object is achieved in that the heat sink device comprises two heat sink elements that are separated from one another by an air gap and that are arranged in such a way that a first heat sink element is mounted inside the motor vehicle headlight and a second heat sink element is mounted outside the motor vehicle headlight, wherein the heat sink device is provided with a contacting device, which is designed in such a way that heat exchange takes place between the heat sink elements via this contacting device when the temperature inside the motor vehicle headlight is higher than the temperature in the area outside the motor vehicle headlight on which the second heat sink element is mounted, and that no heat exchange between the heat sink elements is possible when the temperature inside the motor vehicle headlight is lower than the temperature in the area outside the motor vehicle headlight on which the second heat sink element is mounted.

An advantageous refinement of the device according to the invention provides that the heat sink elements are arranged in such a way that the first heat sink element is positioned in heat transfer contact with the at least one light source arranged in the headlight housing.

Furthermore, it may be expedient when the second heat sink element is oriented in the direction of the engine compartment, and preferably is positioned in an engine compartment, when the motor vehicle headlight is installed.

It may be advantageous when the heat sink elements are arranged in a stationary manner with respect to one another.

Advantageously, the contacting device can comprise at least one heat-conducting contact element, which is movable with respect to the heat sink elements.

In an advantageous embodiment, it can further be provided that the contacting device comprises one contact element or multiple contact elements, allowing heat exchange between the heat sink elements when the temperature inside the motor vehicle headlight is higher than the temperature in the area outside the motor vehicle headlight on which the second heat sink element is mounted, wherein the contact element or the contact elements of the contacting device is or are in simultaneous heat-conducting contact with the first heat sink element and the second heat sink element, and that no heat exchange between the heat sink elements is possible when the temperature inside the motor vehicle headlight is lower than the temperature in the area outside the motor vehicle headlight on which the second heat sink element is mounted, in that the included contact elements of the contacting device are only in contact with one heat sink element in each case or no heat sink element.

Since the contact surfaces of the contact elements, which make contact with one another under the above-described temperature condition to transfer heat, can have a flat or planar design, for example, wear or other reasons can cause the contact surfaces of the contact elements to no longer make contact across the full surface area. This is not conducive to optimal heat transfer, and for this reason a heat conductive paste or other means suitable for improving the heat transfer between two objects may be used.

Furthermore, it may be advantageous when the contacting device comprises a first contact element and a second contact element which enable heat exchange between the heat sink elements when the temperature inside the motor vehicle headlight is higher than the temperature in the area outside the motor vehicle headlight on which the second heat sink element is mounted, wherein the first contact element is in simultaneous heat-conducting contact with the first heat sink element and, via the second contact element, also with the second heat sink element, and that no heat exchange between the heat sink elements is possible when the temperature inside the motor vehicle headlight is lower than the temperature in the area outside the motor vehicle headlight on which the second heat sink element is mounted, in that the contact elements of the contacting device are only in contact with one heat sink element in each case, but not with one another.

It may be provided that at least one contact element of the contacting device is displaceably mounted in at least one recess in a heat sink element.

It is expedient when exactly two contact elements of the contacting device are displaceably mounted in a respective recess in the heat sink elements.

Advantageously, it is provided that the contact elements of the contacting device can be moved by at least one control element assigned to the respective contact element.

Furthermore, it is advantageously provided that a first control element is assigned to the first contact element and a second control element is assigned to the second contact element.

For example, the first control element can be designed in such a way that the first contact element is extended by the first control element when the temperature inside the motor vehicle headlight rises, so that a heat-conducting contact can be established with the second contact element.

Furthermore, it is favorable when the second control element is designed in such a way that the second contact element is retracted by the second control element when the temperature in the area outside the motor vehicle headlight on which the second heat sink element is mounted rises, so that a heat-conducting contact with the first contact element can be suppressed.

It is expedient when the control elements are made of a material that expands and contracts as a function of the temperature.

In one embodiment, it is provided that the control elements are made of bimetal.

When bimetals are used as control elements, for example, the same bimetal could be used for all control elements. It must be noted in this regard that the contact elements travel the same distance, in absolute terms, when heated or cooled by a certain ΔT, with a mirror-inverted positioning of the control elements—that is, the bimetals. For a general function of the invention, it is advisable to establish a "calibration position" at a certain temperature at which the contact surfaces of the contact elements make contact at the same temperature.

For this purpose, the position of the contact elements could be set so that these, for example at 70° C. inside the headlight housing and at 70° C. in the area outside the motor vehicle headlight on which the second heat sink element is mounted, just barely make contact with one another and establish a heat-conducting contact. Likewise, it would be conceivable for the contact elements to be positioned or calibrated so that these, for example at 71° C. inside the headlight housing and at 70° C. in the area outside the motor vehicle headlight on which the second heat sink element is mounted, just barely make contact with one another and establish a heat-conducting contact. The first calibration or positioning would thus be a heat-conducting contact between the contact elements at the same temperature, wherein the second possible calibration position, in which a heat-conducting contact is just barely present between the contact elements, is for a temperature difference at which the temperature inside the headlight housing is just barely higher than the temperature in the area outside the motor headlight.

The invention will be described in more detail hereafter based on the drawings. In the drawings.

Figure 1:
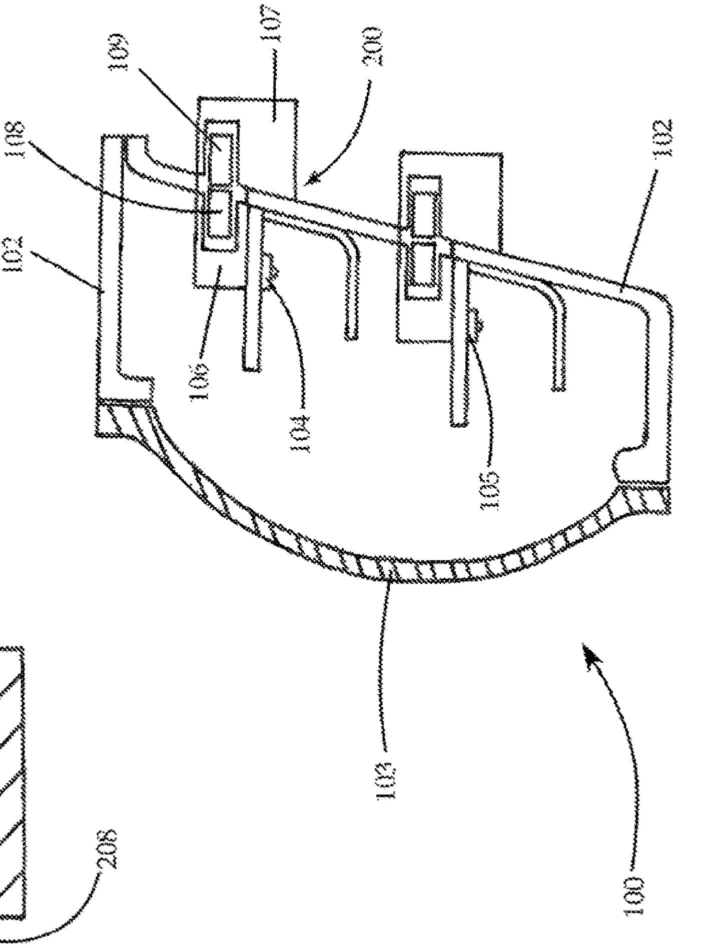
FIG. 1 shows a cross-section of an exemplary motor vehicle headlight.

FIG. 1 shows the motor vehicle headlight 100 according to the invention, comprising a headlight housing 102 and a cover plate 103. Light sources 104, 105 are mounted inside the motor vehicle headlight 100, which each shine light onto an assigned reflector arranged beneath each light source. Directional information such as "top", "bottom", "front" or "rear" refer to a motor vehicle headlight when installed.

As is apparent from FIG. 1, the first heat sink element 106 of the heat sink device 200 is positioned in heat transfer contact with the light source 104 arranged in the motor vehicle headlight 100, and a second heat sink element 107 is oriented in the direction of the engine compartment outside the motor vehicle headlight 100, when the motor vehicle headlight 100 is installed. A detailed view of the heat sink device 200 and of the included components is shown in FIG. 2.

Figure 2:
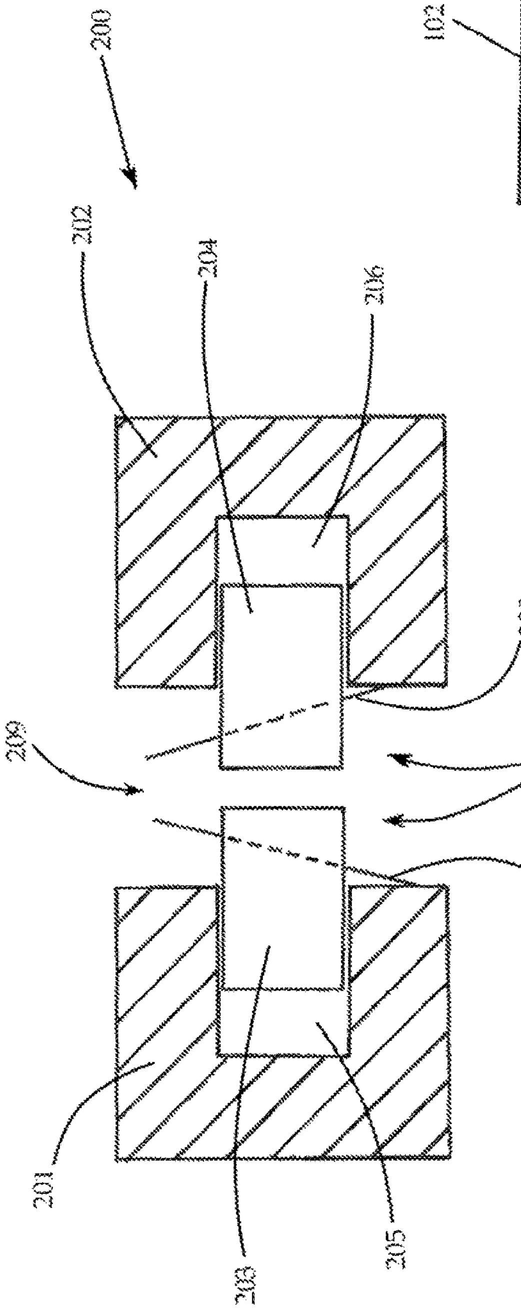
FIG. 2 shows a side view of a heat sink device according to the invention.

As is apparent from FIG. 2, the heat sink device 200 comprises two heat sink elements 201, 202 that are separated from one another by an air gap 209, wherein the two heat sink elements 201, 202 are positioned in a stationary manner with respect to one another. The contacting device 210, which is able to establish thermal contact between the two separate heat sink elements 201, 202, is arranged between the heat sink elements 201, 202. This contacting device 210 comprises the heat-conducting contact elements 203, 204 and the associated temperature-dependent control elements 207, 208.

A first contact element 203 is displaceably mounted in a recess 205 present in the first heat sink element 201, and a second contact element 204 is displaceably mounted in a recess 206 present in the second heat sink element 202. A first control element 207 is assigned to the first contact element 203, and a second control element 208 is assigned to the second contact element 204.

The contact elements 203, 204 can be moved by the respective control elements 207, 208, which in the shown example are made of bimetal, at least partially into or out of the recesses 205, 206.

Figure 3:
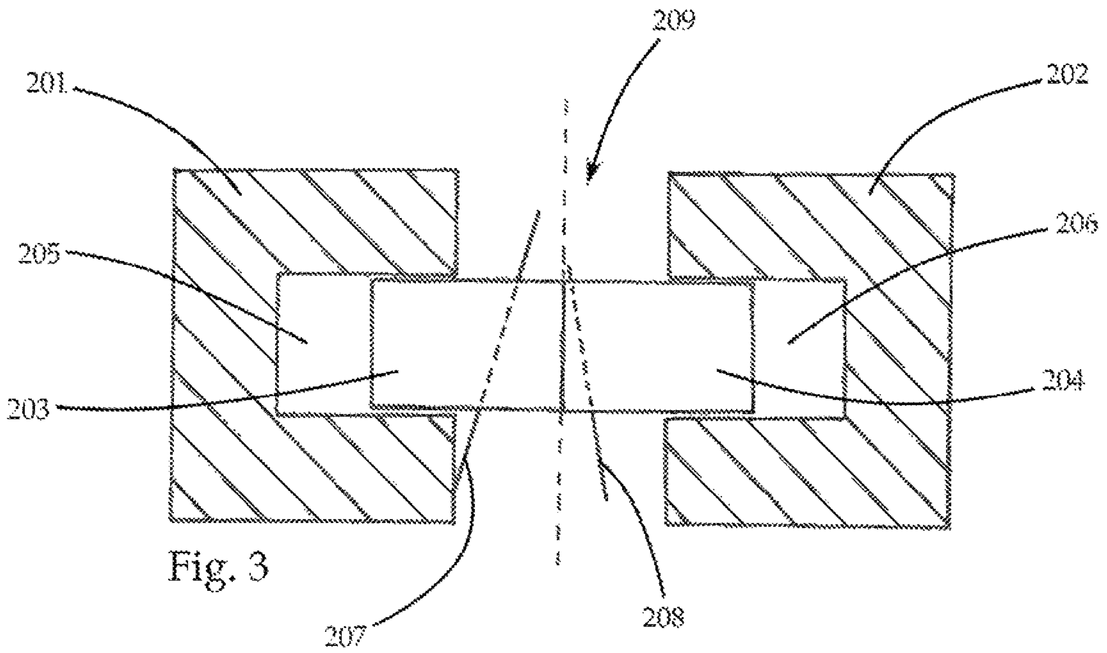
FIG. 3 shows a side view of the heat sink device from FIG. 2 in the state of heat exchange.

FIG. 3 shows the state of the heat sink device 200 from FIG. 2 in which the temperature inside the motor vehicle headlight 100 is higher than the temperature in the area of the second heat sink element 202 oriented into the engine compartment, wherein the first contact element 203 has been moved by the temperature-dependent first control element 207 out of the recess 205 of the first heat sink element 201 so as to establish heat-conducting contact with the second contact element 204 of the second heat sink element 202 and to dissipate heat to the second heat sink element 202.

Figure 4:
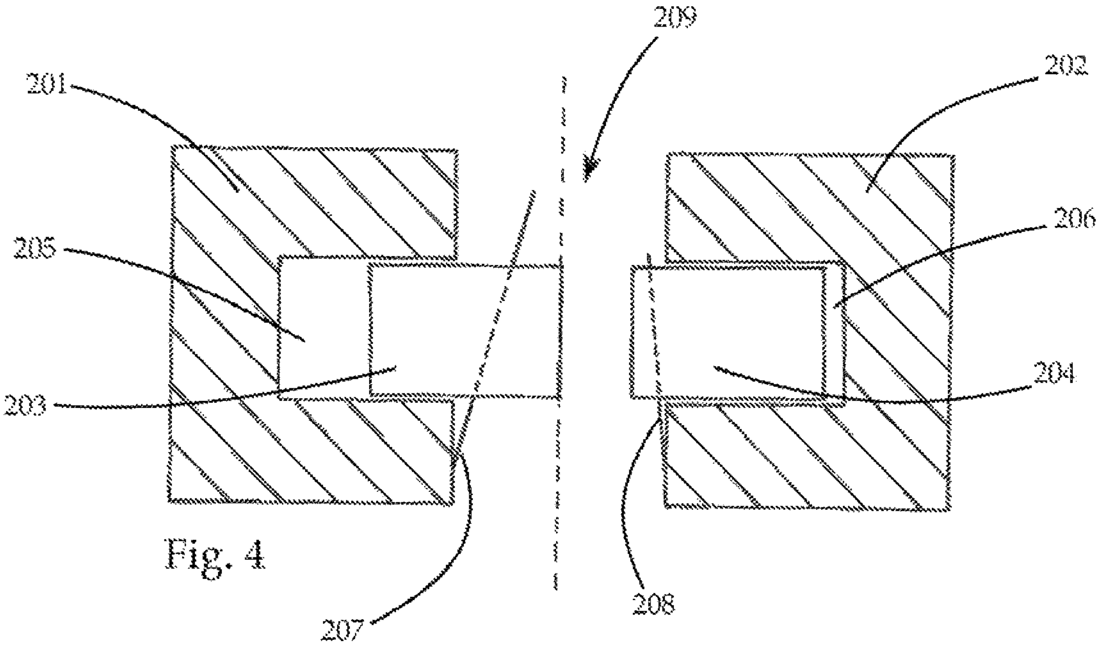
FIG. 4 shows a side view of the heat sink device from FIG. 2 in the state in which no heat exchange takes place.

FIG. 4 depicts the state of the heat sink device 200 from FIG. 2 in which the temperature inside the motor vehicle headlight 100 is lower than the temperature in the area of the second heat sink element 202 oriented into the engine compartment, wherein the second contact element 204 has been moved by the temperature-dependent second control element 208 into the recess 206 of the second heat sink element 202 so as to interrupt the contact with the first contact element 203 of the first heat sink element 201, whereby any heat exchange between the heat sink elements 201, 202 is suppressed.

Figure 5:
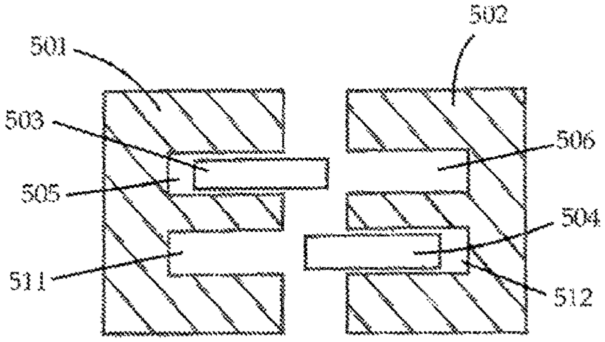
FIGS. 5, 6, 7, 8, 9, and 10 show further possible embodiments of the heat sink device.
Figure 6:
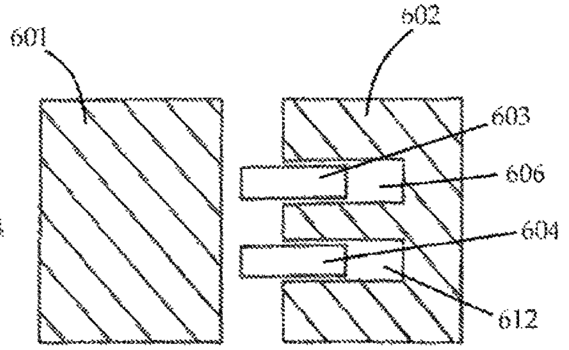
Figure 7:
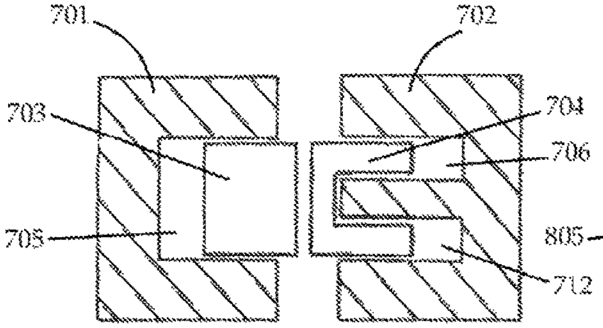

Further possible embodiments of the present invention are shown in the further figures; for example, it is possible for multiple recesses 505, 506, 511, 512, 606, 612, 705, 706, 712 to be provided for the respective heat sink elements 501, 502, 601, 602, 701, 702, as is shown in FIGS. 5, 6 and 7.

In FIG. 5, two recesses 505, 506, 511, 512 are provided for each heat sink element 501, 502, wherein a first contact element 503 is assigned to the first heat sink element 501, and a second contact element 504 is assigned to the second heat sink element 502 and these are arranged in the present recesses 505, 506, 511, 512 in such a way that these cannot make contact in any way as a result of being at least partially pushed out of the recesses 505, 512, wherein each contact element 503, 504 can be moved at least partially into the respective opposite recess 506, 511 so as to establish a heat exchange with the heat sink element 501, 502 not assigned thereto.

Figure 8:
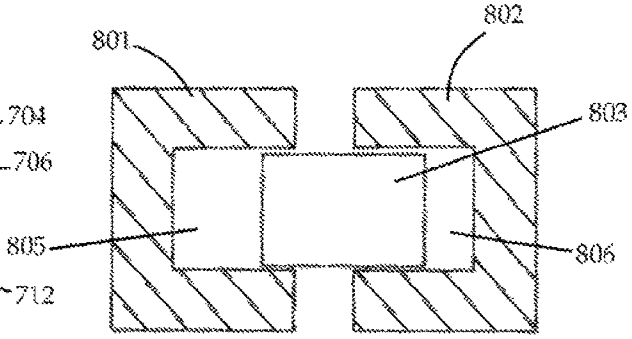
Figure 9:
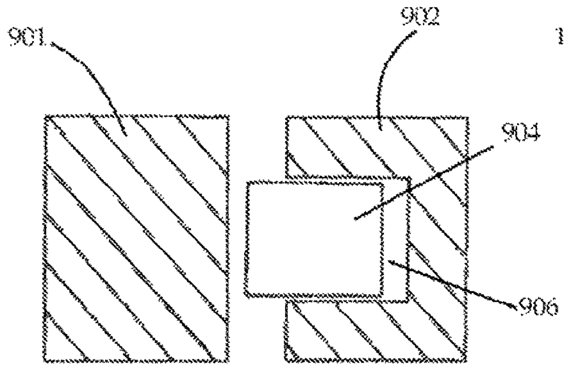

FIG. 6 shows a similar arrangement as in FIG. 5, wherein the first and second contact elements 603, 604 are assigned to a shared second heat sink element 602 and arranged in mutually separated recesses 606, 612, and can be moved at least partially out of these, so as to establish a heat exchange with the first heat sink element 601, which is provided without recesses and assigned contact elements. A similar example, comprising only a single contact element 803, 904, is shown in FIGS. 8 and 9, wherein, in contrast to FIG. 9, an additional recess 805 is provided in the first heat sink element 801 in FIG. 8.

In contrast to the embodiment shown in FIG. 2, FIG. 7 shows an additional second recess 712 in the second heat sink element 702, wherein the second contact element 704 has a horseshoe shape so as to be arrangeable in both recesses 706, 712 of the second heat sink element 702.

Figure 10:
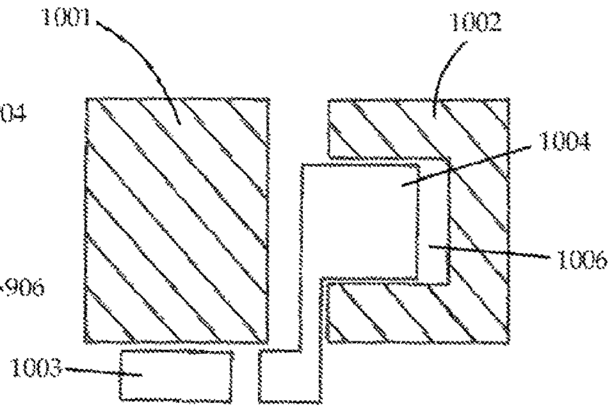

In FIG. 10, the first contact element 1003 is arranged, preferably movably, on the top or bottom side of the first heat sink element 1001, wherein the first heat sink element 1001 does not include any recesses, and the second contact element 1004 is arranged in the recess 1006 of the second heat sink element 1002 and shaped so as to be able to establish heat exchange with the, preferably movable, first contact element 1003 when at least partially pushed out of the recess 1006.

It shall also be noted that it has been dispensed with in FIGS. 5, 6, 7, 8, 9 and 10 to show the respective control elements 207, 208, wherein the contact elements of these embodiments can definitely be moved by the above-described control elements 207, 208.

Moreover, temperature sensors can be provided in the embodiments shown in FIGS. 5, 6, 8 and 9, wherein one temperature sensor is mounted inside the motor vehicle headlight 100 and a further temperature sensor is mounted in the area outside the motor vehicle headlight 100 on which the second heat sink element 502, 602, 802, 902 is mounted. A controller compares the temperatures detected by each of the temperature sensors, compares these, and displaces the respective contact element 503, 504, 603, 604, 803, 904 over the control element 207, 208, which is assigned to the contact element 503, 504, 603, 604, 803, 904 and not shown in these figures, using a drive, such as a linear motor or bellows or diaphragm actuators, so that thermal contact can be established or suppressed according to the above-described temperature conditions.

LIST OF REFERENCE NUMERALS motor vehicle headlight 100
headlight housing 102
cover plate 103
light sources 104, 105
heat sink device 200
first heat sink element 106, 201, 501, 601, 701, 801, 901, 1001
second heat sink element 107, 202, 502, 602, 702, 802, 902, 1002
air gap 209
contacting device 210
first contact element 108, 203, 503, 603, 703, 803, 904, 1003
second control element 109, 204, 504, 604, 704, 1004
first control element 207
second control element 208
recess 205, 206, 505, 506, 511, 512, 606, 612, 705, 706, 712, 805, 806, 906, 1006

The invention claimed is:

1. A motor vehicle headlight (100), comprising:

a headlight housing (102) and a cover plate (103);

at least one light source (104, 105) arranged in said motor vehicle headlight (100), the light of the at least one light source (104, 105) being imagable ahead of the motor vehicle headlight (100) in the form of a defined light distribution; and a heat sink device (200) being provided for cooling the at least one light source (104, 105), wherein the heat sink device (200) comprises two heat sink elements (106, 107, 201, 202, 501, 502, 601, 602, 701, 702, 801, 802, 901, 902, 1001, 1002) that are separated from one another by an air gap (209) and that are arranged in such a way that a first heat sink element (106, 201, 501, 601, 701, 801, 901, 1001) is mounted inside the motor vehicle headlight (100) and a second heat sink element (107, 202, 502, 602, 702, 802, 902, 1002) is mounted outside the motor vehicle headlight (100), wherein the heat sink device (200) is provided with a contacting device (210), which is designed in such a way that heat exchange takes place between the heat sink elements (106, 107, 201, 202, 501, 502, 601, 602, 701, 702, 801, 802, 901, 902, 1001, 1002) via this contacting device (210) when the temperature inside the motor vehicle headlight (100) is higher than the temperature in the area outside the motor vehicle headlight (100) on which the second heat sink element (107, 202, 502, 602, 702, 802, 902, 1002) is mounted, and that no heat exchange between the heat sink elements (106, 107, 201, 202, 501, 502, 601, 602, 701, 702, 801, 802, 901, 902, 1001, 1002) is possible when the temperature inside the motor vehicle headlight (100) is lower than the temperature in the area outside the motor vehicle headlight (100) on which the second heat sink element (107, 202, 502, 602, 702, 802, 902, 1002) is mounted, and wherein the contacting device (210) comprises one contact element (108, 109, 203, 204, 503, 504, 603, 604,

703, 704, 803, 904, 1003, 1004) or a plurality of contact elements (108, 109, 203, 204, 503, 504, 603, 604, 703, 704, 803, 904, 1003, 1004), allowing a heat exchange between the heat sink elements (106, 107, 201, 202, 501, 502, 601, 602, 701, 702, 801, 802, 901, 902, 1001, 1002) when the temperature inside the motor vehicle headlight (100) is higher than the temperature in the area outside the motor vehicle headlight (100) on which the second heat sink element (107, 202, 502, 602, 702, 802, 902, 1002) is mounted, wherein the contact element (108, 109, 203, 204, 503, 504, 603, 604, 703, 704, 803, 904, 1003, 1004) or the contact elements (108, 109, 203, 204, 503, 504, 603, 604, 703, 704, 803, 904, 1003, 1004) of the contacting device (210) is or are in simultaneous heat-conducting contact with the first heat sink element (106, 201, 501, 601, 701, 801, 901, 1001) and the second heat sink element (107, 202, 502, 602, 702, 802, 902, 1002), and that no heat exchange between the heat sink elements (106, 107, 201, 202, 501, 502, 601, 602, 701, 702, 801, 802, 901, 902, 1001, 1002) is possible when the temperature inside the motor vehicle headlight (100) is lower than the temperature in the area outside the motor vehicle headlight (100) on which the second heat sink element (107, 202, 502, 602, 702, 802, 902, 1002) is mounted, in that the included contact elements (108, 109, 203, 204, 503, 504, 603, 604, 703, 704, 803, 904, 1003, 1004) of the contacting device (210) are only in contact with one heat sink element (106, 107, 201, 202, 501, 502, 601, 602, 701, 702, 801, 802, 901, 902, 1001, 1002) in each case or no heat sink element (106, 107, 201, 202, 501, 502, 601, 602, 701, 702, 801, 802, 901, 902, 1001, 1002).

2. The motor vehicle headlight (100) according to claim 1, wherein the heat sink elements (106, 107, 201, 202, 501, 502, 601, 602, 701, 702, 801, 802, 901, 902, 1001, 1002) are arranged in such a way that the first heat sink element (106, 201, 501, 601, 701, 801, 901, 1001) is positioned in heat transfer contact with the at least one light source (104, 105) arranged in the motor vehicle headlight (100).

3. The motor vehicle headlight (100) according to claim 1, wherein the second heat sink element (107, 202, 502, 602, 702, 802, 902, 1002) is arranged outside the motor vehicle headlight on the side of the headlight housing facing away from the cover plate, wherein the second heat sink element (107, 202, 502, 602, 702, 802, 902, 1002), when the motor vehicle headlight (100) is installed, is positioned in an engine compartment.

4. The motor vehicle headlight (100) according to claim 1, wherein the heat sink elements (106, 107, 201, 202, 501, 502, 601, 602, 701, 702, 801, 802, 901, 902, 1001, 1002) are arranged in a stationary manner with respect to one another.

5. The motor vehicle headlight (100) according to claim 1, wherein the contacting device (210) comprises at least one heat-conducting contact element (108, 109, 203, 204, 503, 504, 603, 604, 703, 704, 803, 904, 1003, 1004), which is movable with respect to the heat sink elements (106, 107, 201, 202, 501, 502, 601, 602, 701, 702, 801, 802, 901, 902, 1001, 1002).

6. A motor vehicle headlight (100), comprising:

a headlight housing (102) and a cover plate (103);

at least one light source (104, 105) arranged in said motor vehicle headlight (100), the light of the at least one light source (104, 105) being imagable ahead of the motor vehicle headlight (100) in the form of a defined light distribution; and a heat sink device (200) being provided for cooling the at least one light source (104, 105), wherein the heat sink device (200) comprises two heat sink elements (106, 107, 201, 202, 501, 502, 601, 602, 701, 702, 801, 802, 901, 902, 1001, 1002) that are separated from one another by an air gap (209) and that are arranged in such a way that a first heat sink element (106, 201, 501, 601, 701, 801, 901, 1001) is mounted inside the motor vehicle headlight (100) and a second heat sink element (107, 202, 502, 602, 702, 802, 902, 1002) is mounted outside the motor vehicle headlight (100), wherein the heat sink device (200) is provided with a contacting device (210), which is designed in such a way that heat exchange takes place between the heat sink elements (106, 107, 201, 202, 501, 502, 601, 602, 701, 702, 801, 802, 901, 902, 1001, 1002) via this contacting device (210) when the temperature inside the motor vehicle headlight (100) is higher than the temperature in the area outside the motor vehicle headlight (100) on which the second heat sink element (107, 202, 502, 602, 702, 802, 902, 1002) is mounted, and that no heat exchange between the heat sink elements (106, 107, 201, 202, 501, 502, 601, 602, 701, 702, 801, 802, 901, 902, 1001, 1002) is possible when the temperature inside the motor vehicle headlight (100) is lower than the temperature in the area outside the motor vehicle headlight (100) on which the second heat sink element (107, 202, 502, 602, 702, 802, 902, 1002) is mounted, and wherein the contacting device (210) comprises a first and a second contact element (108, 109, 203, 204, 503, 504, 603, 604, 703, 704, 803, 904, 1003, 1004), allowing a heat exchange between the heat sink elements (106, 107, 201, 202, 501, 502, 601, 602, 701, 702, 801, 802, 901, 902, 1001, 1002) when the temperature inside the motor vehicle headlight (100) is higher than the temperature in the area outside the motor vehicle headlight (100) on which the second heat sink element (107, 202, 502, 602, 702, 802, 902, 1002) is mounted, wherein the first contact element (108, 203, 503, 603, 703, 803, 904, 1003) is in simultaneous heat-conducting contact with the first heat sink element (106, 201, 501, 601, 701, 801, 901, 1001) and, via the second contact element (109, 204, 504, 604, 704, 1004), also with the second heat sink element (107, 202, 502, 602, 702, 802, 902, 1002), and that no heat exchange between the heat sink elements (106, 107, 201, 202, 501, 502, 601, 602, 701, 702, 801, 802, 901, 902, 1001, 1002) is possible when the temperature inside the motor vehicle headlight (100) is lower than the temperature in the area outside the motor vehicle headlight (100) on which the second heat sink element (107, 202, 502, 602, 702, 802, 902, 1002) is mounted, in that the contact elements (108, 109, 203, 204, 503, 504, 603, 604, 703, 704, 803, 904, 1003, 1004) of the contacting device (210) are only in contact with one heat sink element (106, 107, 201, 202, 501, 502, 601, 602, 701, 702, 801, 802, 901, 902, 1001, 1002) in each case, but not with one another.

7. The motor vehicle headlight (100) according to claim 5, wherein at least one contact element (108, 109, 203, 204, 503, 504, 603, 604, 703, 704, 803, 904, 1003, 1004) of the contacting device (210) is displaceably mounted in at least one recess (205, 206, 505, 506, 511, 512, 606, 612, 705, 706, 712, 805, 806, 906, 1006) in at least one heat sink element (106, 107, 201, 202, 501, 502, 601, 602, 701, 702, 801, 802, 901, 902, 1001, 1002).

8. The motor vehicle headlight (100) according to claim 5, wherein exactly two contact elements (106, 109, 203, 204, 503, 504, 603, 604, 703, 704, 1003, 1004) of the contacting device (210) are displaceably mounted in a respective assigned recess (205, 206, 505, 506, 511, 512, 606, 612, 705, 706, 712, 805, 806, 906, 1006) in the heat sink elements (106, 107, 201, 202, 501, 502, 601, 602, 701, 702, 801, 802, 901, 902, 1001, 1002).

9. The motor vehicle headlight (100) according to claim 5, wherein the contact elements (108, 109, 203, 204, 503, 504, 603, 604, 703, 704, 803, 904, 1003, 1004) of the contacting device (210) can be moved by at least one control element (207, 208) assigned to the respective contact element (108, 109, 203, 204, 503, 504, 603, 604, 703, 704, 803, 904, 1003, 1004).

10. The motor vehicle headlight (100) according to claim 6, wherein a first control element (207) is assigned to the first contact element (108, 203, 503, 603, 703, 803, 904, 1003) and a second control element (208) is assigned to the second contact element (109, 204, 504, 604, 704, 1004).

11. The motor vehicle headlight (100) according to claim 10, wherein the first control element (207) is configured that the first contact element (108, 203, 503, 603, 703, 803, 904, 1003) is pushed by the first control element (207) at least partially out of the assigned recess (205, 505, 506, 606, 705, 805, 806, 906) when the temperature inside the motor vehicle headlight (100) rises, so that a heat-conducting contact can be established with the second contact element (109, 204, 504, 604, 704, 1004) or with the second heat sink element (107, 202, 502, 602, 702, 802, 902, 1002).

12. The motor vehicle headlight (100) according to claim 10, wherein the second control element (208) is configured such that the second contact element (109, 204, 504, 604, 704, 1004) is retracted by the second control element (208) further into the assigned recess (206, 511, 512, 612, 706, 712, 1006) when the temperature in the area outside the motor vehicle headlight (100) on which the second heat sink element (107, 202, 502, 602, 702, 802, 902, 1002) is mounted rises, so that a heat-conducting contact with the first contact element (108, 203, 503, 603, 703, 1003) or with the first heat sink element (106, 201, 501, 601, 701, 801, 901, 1001) can be suppressed.

13. The motor vehicle headlight (100) according to claim 9, wherein the control elements (207, 208) are made of a material that expands and contracts as a function of the temperature.

14. The motor vehicle headlight (100) according to claim 9, wherein the control elements (207, 208) are made of bimetal.

15. The motor vehicle headlight (100) according to claim 6, wherein at least one contact element (108, 109, 203, 204, 503, 504, 603, 604, 703, 704, 803, 904, 1003, 1004) of the contacting device (210) is displaceably mounted in at least one recess (205, 206, 505, 506, 511, 512, 606, 612, 705, 706, 712, 805, 806, 906, 1006) in at least one heat sink element (106, 107, 201, 202, 501, 502, 601, 602, 701, 702, 801, 802, 901, 902, 1001, 1002).

16. The motor vehicle headlight (100) according to claim 6, wherein exactly two contact elements (106, 109, 203, 204, 503, 504, 603, 604, 703, 704, 1003, 1004) of the contacting device (210) are displaceably mounted in a respective assigned recess (205, 206, 505, 506, 511, 512, 606, 612, 705, 706, 712, 805, 806, 906, 1006) in the heat sink elements (106, 107, 201, 202, 501, 502, 601, 602, 701, 702, 801, 802, 901, 902, 1001, 1002).

17. The motor vehicle headlight (100) according to claim 6, wherein the contact elements (108, 109, 203, 204, 503, 504, 603, 604, 703, 704, 803, 904, 1003, 1004) of the contacting device (210) can be moved by at least one control element (207, 208) assigned to the respective contact element (108, 109, 203, 204, 503, 504, 603, 604, 703, 704, 803, 904, 1003, 1004).

18. The motor vehicle headlight (100) according to claim 17, wherein the control elements (207, 208) are made of a material that expands and contracts as a function of the temperature.

19. The motor vehicle headlight (100) according to claim 17, wherein the control elements (207, 208) are made of bimetal.

* * * * *